(12) United States Patent
Samie et al.

(10) Patent No.: US 7,967,561 B2
(45) Date of Patent: Jun. 28, 2011

(54) VANE AIR-COOLING SYSTEM FOR AUTOMATIC TRANSMISSION TORQUE CONVERTER

(75) Inventors: Farzad Samie, Franklin, MI (US); Arshia Vahabzadeh, Oakland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 975 days.

(21) Appl. No.: 11/833,289

(22) Filed: Aug. 3, 2007

(65) Prior Publication Data

US 2009/0035129 A1 Feb. 5, 2009

(51) Int. Cl.
*F16D 13/72* (2006.01)
(52) U.S. Cl. .................................. 415/178; 192/113.21
(58) Field of Classification Search ................. 415/177, 415/178; 416/180; 192/113.21
See application file for complete search history.

(56) References Cited

U.S. PATENT DOCUMENTS

| 2,391,648 | A | * | 12/1945 | Seybold | 475/56 |
| 3,026,679 | A | * | 3/1962 | Howard | 60/337 |
| 3,280,657 | A | * | 10/1966 | Holdeman | 192/3.25 |
| 4,373,617 | A | | 2/1983 | Mathues | |
| 4,423,803 | A | | 1/1984 | Malloy | |

* cited by examiner

*Primary Examiner* — Richard Edgar
(74) *Attorney, Agent, or Firm* — Quinn Law Group, PLLC

(57) ABSTRACT

A cooling system is provided for automatic transmission torque converter assemblies having a housing shell and flex plate. The cooling system includes a housing cover having opposing exterior and interior surfaces that define a wall portion and a preferably circular base portion. The base portion is configured to attach to the flex plate, preferably by one or more stud members, to be rotated thereby. The wall portion extends from a periphery of the base portion and is configured to attach to the housing shell. The cooling system also includes a plurality of vane members positioned along the outer periphery of the base portion. The vane members are configured to increase convective dissipation of heat from the torque converter assembly to surrounding ambient air by increasing the heat transfer coefficient and surface area. Optimally, the vanes have a turbine fin configuration, but may alternatively have curved fin or a straight-fin configuration.

20 Claims, 3 Drawing Sheets

VANE AIR-COOLING SYSTEM FOR AUTOMATIC TRANSMISSION TORQUE CONVERTER

TECHNICAL FIELD

The present invention relates generally to torque converter devices for automatic transmissions, and more specifically to cooling systems for torque converter devices and torque converter clutches.

BACKGROUND OF THE INVENTION

Most conventional motorized vehicles include a powertrain that has a power source, such as an internal combustion engine, connected to a multi-speed power transmission that is adapted to manipulate and transmit power from the engine to a final drive (e.g., driveshaft, differential, and wheels) for propelling the vehicle. Traditional powertrains having an automatic transmission generally include a hydrodynamic input device, such as a torque converter, positioned between the engine and the transmission. The torque converter is a hydrokinetic fluid coupling employed predominantly to allow the engine to run without stalling when the vehicle wheels and transmission gears come to a stop, and to provide torque multiplication in the lower speed range of the engine.

The hydrodynamic torque converter essentially consists of an impeller member, a bladed turbine, and a fluid stator. The impeller member, also referred to in the art as the torque converter pump, is secured to an annular shell member that is adapted to drivingly connect the impeller to the engine crankshaft. The bladed turbine is traditionally connected to an input shaft of the automatic transmission through a turbine hub. The stator mechanism, disposed between the fluid inlet of the impeller and the fluid outlet of the turbine, redirects fluid from the turbine to the impeller to improve flow efficiency and increase torque multiplication of the torque converter. The impeller accelerates hydraulic fluid for passage to the turbine; the turbine in turn converts the kinetic energy from the impeller into mechanical energy, which is transmitted to the transmission input shaft.

In many torque converter assemblies, the annular shell member and the bladed turbine cooperate to form a chamber for housing a torque converter clutch, also referred to in the art as a lock-up clutch. The torque converter clutch (or "TCC") is operated to provide a bypass mechanism, allowing the engine to circumvent the torque converter and transmit power directly to the transmission.

Many conventional TCC's incorporate two clutch structures disposed in serial drive relationship—a friction clutch and a viscous shear clutch. The friction clutch includes a pressure plate having a friction surface disposed thereon and biased out of engagement with the annular shell member by a spring member. The pressure plate responds to a hydraulic actuator imparting fluid pressure thereto, urging the friction surface against the annular shell member, effectively locking the impeller to the turbine.

The TCC may be fully engaged (completely locked-up) or partially engaged (selectively "slip" in a controllable manner.) In the partially engaged state, the TCC friction surface is allowed to slip along the contact surface of the annular shell member; frictional heat is generated by the TCC when partially engaged due to this slipping phenomenon. Traditionally, heat generated by the TCC is attenuated by hydraulic fluid, such as automatic transmission fluid (ATF), inside the torque converter housing, which is circulated out of the assembly to a heat sink and thereafter recycled.

The circulation of ATF keeps the transmission within the normal operating temperature range. Oil routing through the transmission and torque converter assembly have been designed for most cooling purposes. In heavy-duty and/or high performance vehicles, an auxiliary transmission oil cooler assembly may be used. Mounted in front of the radiator, it serves as a cooler for the ATF so transmission temperatures do not exceed the required operating range. However, such additional componentry leads to increased costs and added vehicle weight (which leads to decreased fuel economy.)

SUMMARY OF THE INVENTION

Provided is a vane air-cooling system for an automatic transmission torque converter assembly. The present invention serves as an efficient air-cooling device with minimal added costs and vehicle weight. The technical advantage of the invention is to utilize otherwise empty space available between the torque converter assembly and flex plate to increase convection to air by increasing the heat transfer coefficient and surface area, as well as decreasing air flow temperature. The present invention thereby offers improved cooling of the transmission, the torque converter assembly, and TCC, leading to increased durability, efficiency, and operational life expectancy of the torque converter assembly and TCC.

According to a first embodiment of the present invention, a vane air-cooling system is provided for a torque converter assembly having a housing shell and a flex plate. The vane air-cooling system includes a housing cover having opposing exterior and interior surfaces which define a rotatable base portion and a wall portion. The base portion is fixedly attached to the flex plate, whereas the wall portion extends from an outer periphery of the base portion and is configured to attach to the housing shell. The vane air-cooling system also includes a plurality of vane members positioned along the outer periphery of the base portion, preferably evenly spaced between the flex plate and the housing shell. The vane members are configured to increase the convective dissipation of heat from the torque converter assembly to surrounding ambient air when the base portion rotates. Ideally, the base portion is substantially circular, wherein the wall portion extends substantially perpendicular from the base portion in a continuous manner about the base portion's periphery.

Preferably, each vane has a crown portion and a bottom portion connected to each other by opposing first and second edges and opposing first and second faces. The bottom portion operatively connects each vane to the base portion.

Optimally, the vanes have a turbine tin configuration, wherein the first and second edges are oriented radially out-of-plane relative to a true radius extending from a center of the housing cover. In this instance it is also preferred that the first and second surfaces have a convex profile relative to the true radius. In addition, the first and second edges have a convex profile relative to the base portion.

Alternatively, the vanes preferably have a curved fin configuration, wherein the first and second edges are oriented radially out-of-plane relative to a true radius extending from the center of the housing cover. In this instance it is also preferred that the first and second surfaces have a convex profile relative to the true radius.

According to yet another alternate, the vanes preferably have a straight-fin configuration, wherein the first and second edges are oriented radially-in-plane relative to a true radius extending from the center of the housing cover. In this instance it is also preferred that the first and second surfaces extend substantially perpendicular from the base portion.

Preferably, the exterior and interior surfaces also include a centering pilot extending substantially perpendicular from the base portion. The centering pilot is configured to coaxially position the torque converter assembly with the flex plate.

According to a second embodiment of the present invention, a vane air-cooling system is provided for a torque converter assembly having an impeller and a flex plate. The vane air-cooling system includes a housing shell and a housing cover. The housing shell is operatively connected to the impeller to at least partially define a substantially annular fluid chamber therebetween. The housing cover includes a rotatable base portion and a wall portion. The base portion is operatively configured to attach to the flex plate. The wall portion extends from an outer periphery of the base portion, and is configured to attach to tire housing shell. The housing cover also includes a plurality of vane members positioned along the outer periphery of the base portion between the housing shell and flex plate. The vane members are configured to increase the convective dissipation of heat from the torque converter assembly to surrounding ambient air when the base portion rotates. Ideally, the base portion is substantially circular, wherein the wall portion extends substantially perpendicular from the base portion in a continuous manner about the base portion's outer periphery. Preferably, the base portion is configured to attach to the flex plate by one or more stud members.

Preferably, each vane has a crown portion and a bottom portion connected to each other by opposing first and second edges and opposing first and second faces. The bottom portion operatively connects each vane to the base portion.

Optimally, the vanes have a turbine fin configuration, wherein the first and second edges are oriented radially out-of-plane relative to a true radius extending from a center of the housing cover. In this instance it is also preferred that the first and second surfaces have a convex profile relative to the true radius. In addition, the first and second edges have a convex profile relative to the base portion.

Alternatively, the vanes may have a curved fin configuration, wherein the first and second edges are oriented radially out-of-plane relative to a true radius extending from the center of the housing cover. In this instance it is also preferred that the first and second surfaces have a convex profile relative to the true radius.

According to yet another alternative, the vanes have a straight-fin configuration, wherein the first and second edges are oriented radially-in-plane relative to the true radius extending from the center of the housing cover. In this instance it is also preferred that the first and second surfaces extend substantially perpendicular from the base portion.

Preferably, the housing cover also includes a centering pilot extending substantially perpendicular from the base portion. The centering pilot is configured to coaxially position the torque converter assembly with the flex plate.

The above features and advantages, and other features and advantages of the present invention will be readily apparent from the following detailed description of the preferred embodiments and best modes for carrying out the present invention when taken in connection with the accompanying drawings.

DESCRIPTION OF THE PREFERRED EMBODIMENTS

Figure 1:
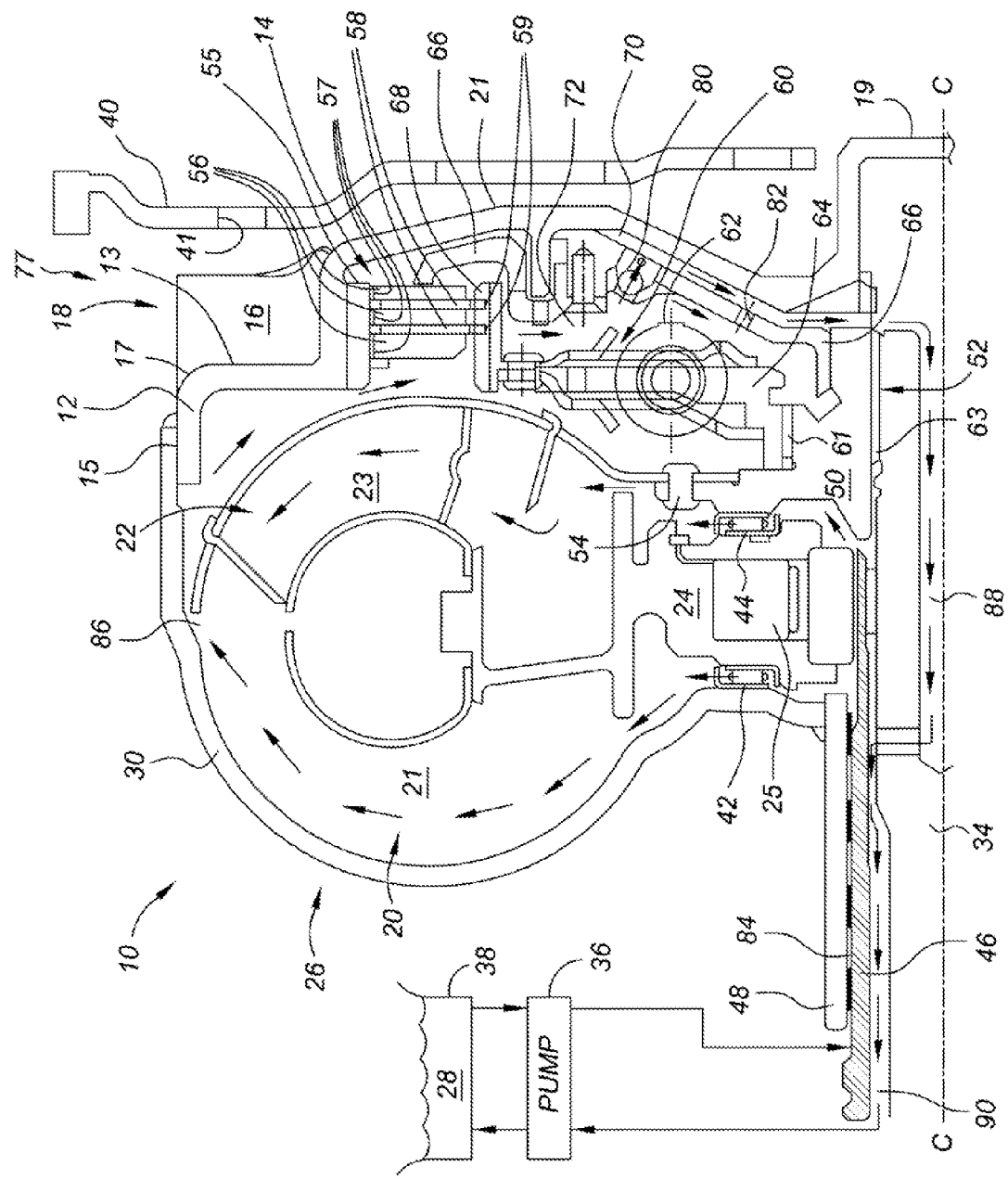
FIG. 1 is a cross-sectional side-view of a portion of an exemplary hydrodynamic torque converter assembly having a torque converter clutch and a vane air-cooling system in accordance with the present invention.

Referring to the drawings, wherein like reference number refer to the same or similar components throughout the several views, FIG. 1 is a cross-sectional side-view of a portion of an exemplary hydrodynamic torque converter assembly, identified generally as 10, in accordance with the present invention. The torque converter assembly 10 is preferably adapted to be operatively positioned between a prime mover, such as an internal combustion engine (not shown), and an automatically shifted multi-speed power transmission (not shown.) The torque converter assembly 10 can also be incorporated into other types of vehicles (e.g., hybrid vehicles, electric vehicles, etc.) across various platforms (e.g., passenger car, light truck, heavy duty, and the like.)

The exemplary torque converter assembly 10 of FIG. 1 includes an electronically controlled converter clutch (hereinafter "ECCC") 14, a torque converter pump or impeller 20, a bladed turbine 22, and a stator 24. The impeller 20 is situated in serial power flow, fluid communication with the turbine 22. The stator 24 is interposed between the impeller 20 and turbine 22 so that it can alter fluid flow returning from the turbine 22 to the impeller 20, as will be explained in more detail below.

The torque converter assembly 10 also includes an annular housing member 26, defined by a pump shell portion 30 fixedly attached (e.g., via welding) to a front cover 12 such that a chamber full of hydraulic fluid 28 is formed therebetween, the front cover 12 forming a part of the vane air-cooling system 18, as will be described in extensive detail with regards to FIGS. 2A-4 below. A flex plate 40 is adapted, e.g., via a plurality of apertures 41 formed therethrough and configured to receive bolts (e.g., bolt 79 of FIG. 2A), to be connected to studs (76 of FIG. 2), to both the engine (not shown) and the annular housing member 26 such that engine torque is transferable therebetween.

The transfer of engine torque from the annular housing member 26 and impeller 20 to the turbine 22 through operation of the hydraulic fluid 28 generally occurs in the following manner. Rotation of the impeller 20 causes the hydraulic fluid 28 to be directed outward toward the turbine blades 21. When this occurs with sufficient force to overcome the resistance to rotation, the turbine 22 begins to rotate coaxially with the impeller 20. The fluid flow exiting the turbine 22 is directed back into the impeller 20 by way of the stator 24. The stator 24 redirects the fluid flow from the turbine 22 to the impeller 20 in the same direction as impeller rotation, thereby reducing pump torque and causing torque multiplication.

The torque converter assembly 10 preferably includes first and second thrust bearings 42, 44, respectively, configured to rotatably support the stator 24. The stator 24 is connected to a stator shaft 46 by way of a one-way roller clutch 25 that is operable to prevent rotation of the stator 24 at low torque converter speeds. At higher torque converter speeds, the direction of hydraulic fluid 28 leaving the turbine 22 changes, causing the stator 24 to over-run the one-way clutch 25 and rotate freely on the stator shaft 46. The impeller 20 is secured to the pump hub 48, whereas the turbine 22 is secured to a turbine shaft 34. Ideally, a locking mechanism 50 is disposed between, and configured to operatively couple the turbine 22 and the turbine shaft 34. The locking mechanism 50 is secured to the turbine 22 by, for example, a plurality of rivets 54, and engages the turbine shaft 34 via a splined interface 52.

According to the embodiment of FIG. 1, the torque converter assembly 10 also includes an isolator 60. A radially inner portion 64 of the isolator 60 is splined at 61 to the locking mechanism 50, which is in turn splined at 63 to the turbine shaft 34. The isolator 60 includes a plurality of isolator springs 62 configured to at least partially absorb engine torque spikes in order to provide smoother vehicle operation.

The front cover 12 and turbine 22 cooperate to house the ECCC 14, positioned therebetween, within the torque converter assembly 10. The ECCC 14 includes a clutch pack, defined herein by a plurality of friction plates 58 interspersed between a plurality of reaction plates 56, as best seen in FIG. 1. The reaction plates 56 are operatively connected to the front cover 12 of the annular housing member 26 via housing extension 55 through splines 57. The friction plates 58 are operatively connected with a radial outer portion 68 of the isolator 60 through splines 59. The ECCC 14 is preferably hydraulically actuated, i.e., the various operating modes of the ECCC 14 are selectable by manipulating transfer of the hydraulic fluid 28 through the torque converter assembly 10 in a predetermined manner, as will be described in detail below.

The ECCC 14 includes a piston member 66 configured to selectively bring the reaction plates 56 into frictional communication with the friction plates 58 and thereby engage the ECCC 14. A first cavity 70 is declined between the piston 66 and the front cover 12. A second cavity 72 is defined between the piston 66 and the isolator 60. The ECCC 14 also includes a one-way valve 80 configured to control the transfer of hydraulic fluid 28 from the second cavity 72 to the first cavity 70, as will be discussed in further detail below. While a single one-way valve 80 is shown, it should be appreciated that multiple valves may alternatively be implemented. A pump 36 is fluidly coupled to the torque converter assembly 10 and operable to transfer hydraulic fluid 28 from a sump volume 38 thereto. After being circulated through the torque converter assembly 10, the pump 36 returns the hydraulic fluid 28 to the sump volume 38.

The one-way valve 80 is operable to block the transfer of hydraulic fluid 28 from the first cavity 70 to the second cavity 72. Therefore, the transfer of hydraulic fluid 28 from the first cavity 70 to the second cavity 72 takes place almost exclusively through the orifice 82; the rate of such transfer is dictated by the site of the orifice 82. The hydraulic fluid 28 in the second cavity 72 is transferred through the opening 86 and thereafter passes across the blades 23 of the impeller 20 and through the thrust bearing 42, and via a second flow path across the blades 21 of the turbine 22 and through the thrust bearing 44. These two flow paths come together at a release passage 84 which routes the hydraulic fluid back to the sump volume 38 of FIG. 1.

When the fluid pressure in the second cavity 72 exceeds that in the first cavity 70, the piston 66 translates axially along a centerline C in a direction toward the flex plate 40 (as shown in FIG. 1) thereby disengaging the clutch pack, i.e., reaction plates 56 and friction plates 58. When the fluid pressure in the first cavity 70 exceeds that in the second cavity 72, the piston 66 translates axially along centerline C in a direction away from the flex plate 40, thereby engaging the clutch pack. The amount by which the pressure in the first cavity 70 exceeds the pressure in the second cavity 72 dictates the degree of ECCC 14 engagement. By way of example, if the pressure in the first cavity 70 only slightly exceeds the pressure in the second cavity 72, the ECCC 14 is only partially engaged and may therefore slip.

The piston 66 preferably also defines one or more orifices 82 configured to allow the transfer of hydraulic fluid 28 between the cavities 70 and 72. The orifice 82 allows for the circulation of a predetermined amount of hydraulic fluid 28 throughout the torque converter assembly 10 to mitigate heal buildup.

The ECCC 14 hits three primary operational modes: "disengaged", "fully engaged", and "partially engaged". "Disengaged" refers to the mode wherein the reaction plates 56 and friction plates 58 do not come into contact with each other and are therefore free to rotate independently. "Fully engaged" refers to the mode wherein the reaction plates 56 and friction plates 58 are brought into engagement with an apply force that is sufficient to pie vent relative rotation or "slip" under normal operating conditions, "Partially engaged" refers to the mode wherein the reaction plates 56 and friction plates 58 are brought into engagement with a reduced apply force such that the reaction plates 56 and friction plates 58 slip relatively in a controllable manner. By controlling the pressure levels in the cavities 70 and 72, as described above, the ECCC 14 can correspondingly be controlled to disengage, completely engage, or partially engage and slip in a controllable manner.

When the ECCC 14 is in the disengaged mode, the engine (not shown) transfers power (e.g., torque) through the torque converter assembly 10 to the transmission (not shown). Specifically, torque is passed from the engine crankshaft (not shown) through the flex plate 40 (adapted to drivingly connect the engine to the housing member 26) to the impeller 20. Thereafter, engine torque is transferred from the impeller 20 to the turbine 22 through operation of the hydraulic fluid 28, as described above. The turbine 22 is coupled to the turbine shaft 34, which is operatively connected to a driving member (not shown) of the transmission. According to the embodiment of the present invention shown in FIG. 1, when the ECCC 14 is disengaged, the path of engine torque bypasses the isolator 60.

When the ECCC 14 is fully engaged, the engine circumvents the torque converter assembly 10, transmitting power directly to the transmission without any efficiency losses associated with the operation of the hydraulic fluid 28. As will be described in detail hereinafter, engagement of the ECCC 14 couples the impeller 20 and the turbine 22 such that the torque converter pump 20 and turbine 22 rotate as a single unit. According to the embodiment shown in FIG. 1, when the ECCC 14 is fully engaged, the path of engine torque is through the isolator 60, and the inertia of the turbine 22 is downstream relative to the isolator 60.

When the ECCC 14 is partially engaged, it can selectively slip in a controllable manner and thereby transfer torque both directly to the transmission, and via the torque converter assembly 10. By controlling the degree of ECCC 14 engagement, and correspondingly the amount of slip, the ECCC 14 may be implemented to at least partially absorb engine torque spikes and thereby provide smoother vehicle operation.

To release the ECCC 14, the pump 36 is operated to transfer hydraulic fluid 28 through the torque converter assembly 10 in the direction of the arrows of FIG. 1. The hydraulic fluid 28 is transferred initially from the sump volume 38 through the release passage 84 between the pump hub 48 and the stator shaft 46. The hydraulic fluid 28 thereafter passes through the first thrust bearing 42, across the blades of the impeller 20, and the second thrust bearing 44, across the blades of the turbine 22. Subsequently, the hydraulic fluid 28 exits through an opening 86 between the turbine 22 and the shell 30 of the housing member 26, passes by the clutch pack of the ECCC 14, and into the second cavity 72. The hydraulic fluid 28 is then transferred from the second cavity 72 to the first cavity 70 through the one-way valve 80 and orifice 82, which is then transferred through a third cavity 88 defined by the turbine shaft 34, out of an apply passage 90 between the stator shaft 46 and the turbine shaft 34, and back to the sump 38. It should be readily appreciated that the pumping of hydraulic fluid 28 into the second cavity 72 generates pressure therein such that the piston 66 is translated away from the clutch pack, i.e., plates 56, 58, and the ECCC 14 remains disengaged.

To either partially or completely engage the ECCC 14, the pump 36 is operated to transfer hydraulic fluid 28 through the torque converter assembly 10 in a direction opposite to that shown by the arrows in FIG. 1, and previously described with respect to the release of the ECCC 14. More specifically, to engage the ECCC 14, the pump 36 initially transfers hydraulic fluid 28 from the sump volume 38 through the apply passage 90 and into the first cavity 70, generating pressure therein such that the piston 66 is translated toward the clutch pack, i.e., reaction plates 56 and friction plates 58. Urging of the piston 66 in this manner applies a force tending to bring the reaction plates 56 into contact with the friction plates 58 such that the ECCC 14 is engaged. The magnitude of the force applied by the piston 66 is proportional to the pressure level in the first cavity 70. Therefore, the degree of ECCC 14 engagement is selectable by controlling the output of the pump 36 as it transfers hydraulic fluid 28 into the first cavity 70.

Figure 2A:
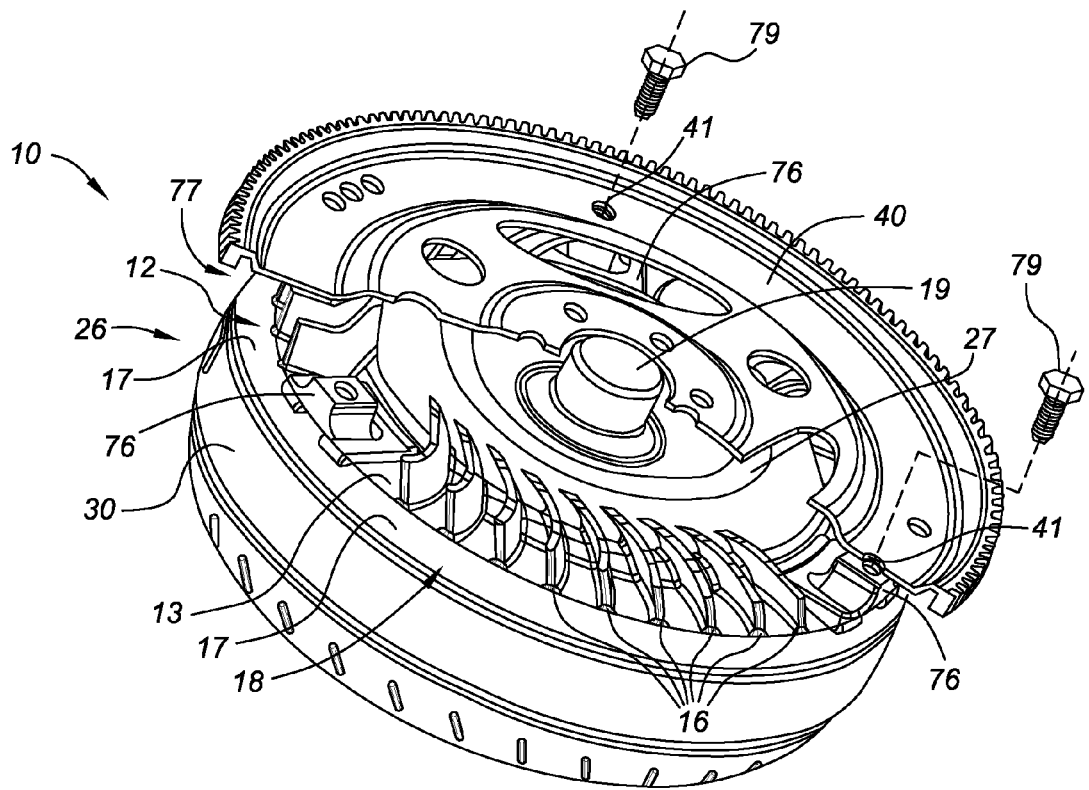
FIG. 2A is an isometric perspective view of the hydrodynamic torque converter assembly of FIG. 1 with a portion of the flex plate broken away to illustrate the vane air cooling system in accordance with a preferred embodiment of the present invention.

Turning now to FIG. 2A of the drawings, a perspective view of the torque converter assembly 10 of FIG. 1 is shown, with a portion of the flex plate 40 broken away to illustrate a preferred embodiment of the vane air-cooling system 18 of the present invention. The vane air-cooling system 18 includes the front cover 12 and a plurality of arcuate vanes or annular fins 16, configured to increase the connective dissipation of heat from the torque converter assembly 10 and ECCC 14 to the surrounding ambient air. The vane air-cooling system 18 is preferably fabricated from a material known to have a suitable strength for its intended use, e.g., cold rolled steel, hot clipped galvanized steel, stainless steel, aluminum, and the like, and may be finished with an anti-corrosive, highly durable, heat resistant coating (e.g., dichromate paint, zinc plating, etc., not shown.) The vane air-cooling system 18 is fabricated, for example; by one or more of machining, stamping, rolling, press-forming, cold-forming, hydro-forming, flow-forming, and the like.

Figure 2B:
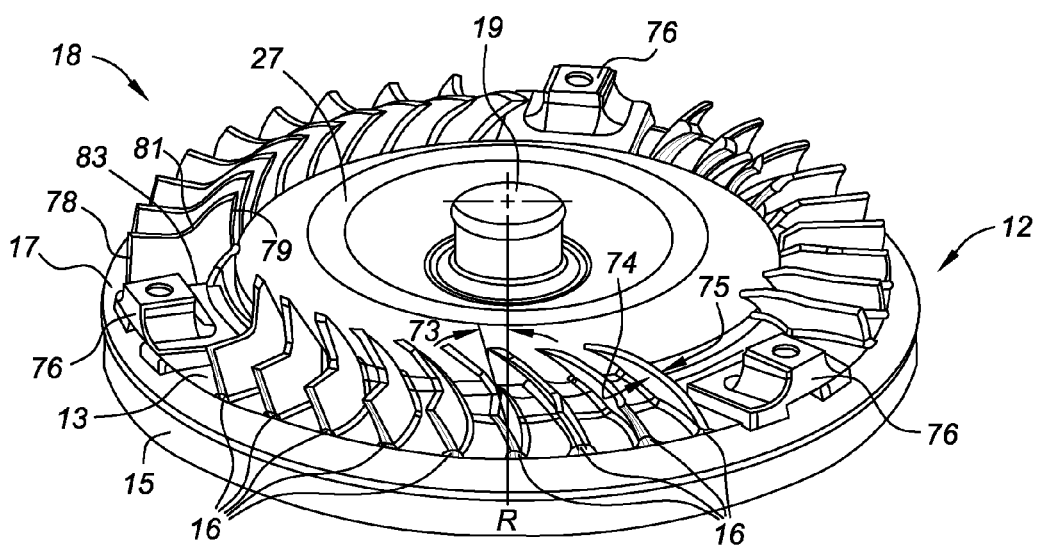
FIG. 2B is an enlarged perspective view of the vane air-cooling system of FIG. 2A.

Referring to both FIGS. 2A and 2B, the front cover 12 includes an exterior surface, defined generally by a circular base 13, peripheral wall 15, rounded portion 17, centering pilot 19, and contoured portion 27. The circular base 13 is connected to the peripheral wall 15 by the rounded portion 17, the peripheral wall 15 extending substantially perpendicular from the base 13. The contoured portion 27 connects the circular base 13 to the centering pilot 19. The centering pilot 19 is located at the center of the front cover 12 and operable to position the front cover 12 (and thus the entire torque converter assembly 10) coaxially with the engine crankshaft (not shown.)

The vanes 16 of the vane air-cooling system 18 are preferably arranged in a circumferentially spaced circular array along the outer periphery of the circular base 13 and contoured portion 27 of the front cover 12, positioned within a space 77 between the front cover 12 and flex plate 40. In at least one embodiment, the space 77 is at least 2.54 centimeters (about one inch.) According to the preferred embodiment of FIGS. 2A and 2B, it is further preferred that the vanes 16 are elongated in a direction extending at desired angles (identified generally in FIG. 2B as 73) to a true radius R extending along the circular base 13 from the center of the front cover 12. In other words, the vanes 16 are tangentially offset relative to a radial plane extending from the center of the front cover 12. Alternatively, the vanes 16 may each be positioned radially coextensive (in-plane) with the radius R along the circular base 13, as will be more apparent with regard to the alternate embodiments depicted in FIGS. 3 and 4. In a similar regard, the vanes 16 may have various geometric configurations in a plan view and profile view.

With reference to FIG. 2B, for example, the vanes 16 have substantially opposing first and second surfaces 74 and 75 respectively, first and second substantially opposing edges 78, and 79, respectively, a crown portion 81, and a bottom portion 83 fixedly connected to the circular base 13 and contoured portion 27 (e.g., via arc welding.) The dimensions of the vanes 16, including height, thickness, and length, are predetermined and may vary indefinitely depending upon the space 77 (see FIGS. 1 and 2A) available between the front cover 12 and flex plate 40. Although depicted as having identical configurations, each vane 16 may vary from the next. According to FIGS. 2A and 2B, the vanes 16 preferably have a turbine fin configuration. More specifically, the crown portion 81 has a convex plan-profile, the first edge 78 being radially out of plane from the second edge 79. In addition, the first and second edges are both oriented at acute angles relative to the circular base 13, creating an inclined curved configuration.

Heat is generated in the torque converter assembly 10 by the ECCC 14. During application and slip control of the ECCC 14, as described above, the ECCC 14 temperature increases rapidly depending on slip and input torque. While the hydraulic fluid 28 does its part to contribute to cooling the torque converter assembly 10, the vane air-cooling system utilizes empty space available between the front cover 12 and flex plate 40 to increase cooling by air, through forced convective heat transfer. More specifically, the volume of heat generated by the ECCC 14 diffused through convective heat transfer is amplified by increasing the heal transfer surface area of the front cover 12, the overall mass of the torque converter assembly 10, and the mass flow rate of air, thereby increasing the heat transfer coefficient and decreasing air flow temperature, which increases the durability of the torque converter assembly 10, ECCC 14, and hydraulic fluid 28 due to lower operating temperatures. The circular base 13, rounded portion 17, centering pilot 19, contoured portion 27 of the front cover 12, and the first and second surfaces 74, 75, first and second edges 78, 79, and crown portion 81 of the vanes 12, and an inner surface 43 of the flex plate 40 define a cooling gallery therebetween. Provided the vanes 16 are turning at engine speed (e.g., through the driving engagement between the annular housing member 26 and the lie a plate 40), air circulation in the space 77 between the torque converter assembly 10 and flex plate 40 is enhanced.

Figure 3:
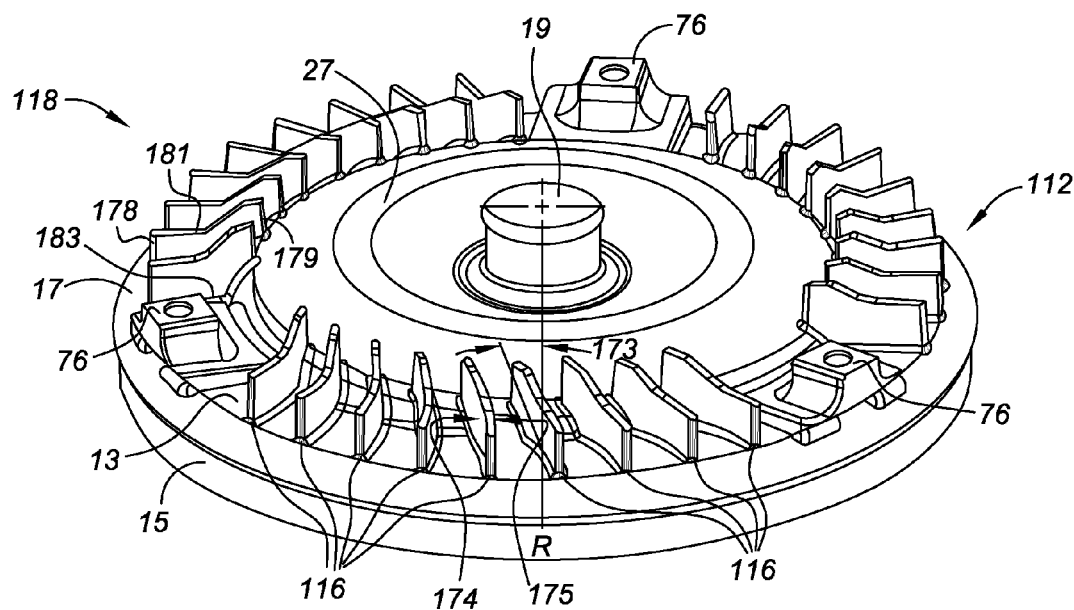
FIG. 3 is an enlarged perspective view of a vane air-cooling system in accordance with a first alternate embodiment of the present invention.
Figure 4:
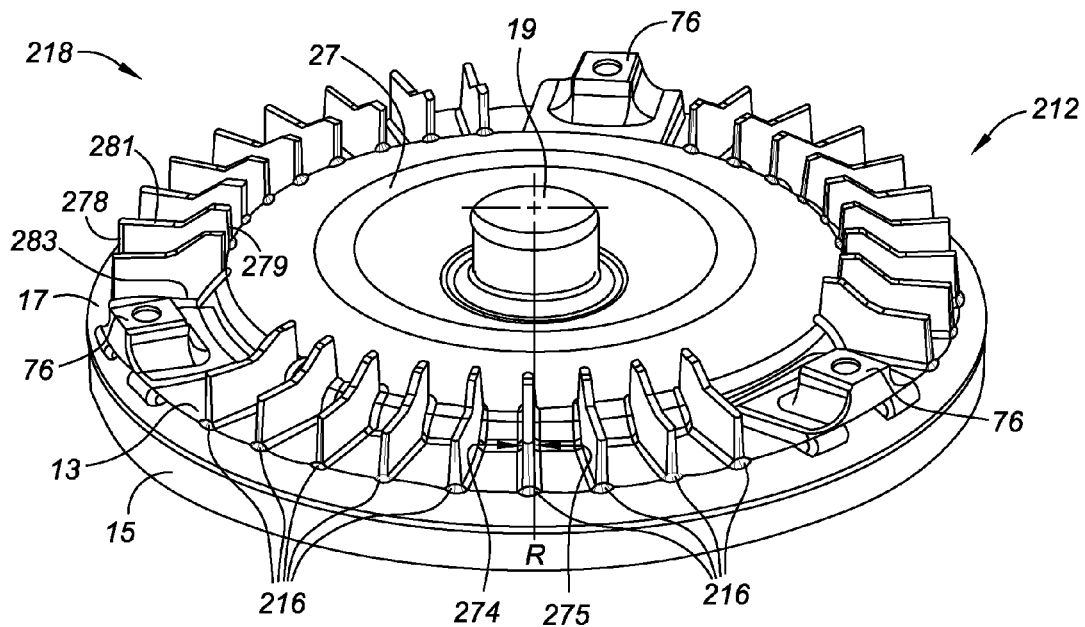
FIG. 4 is an enlarged perspective view of a vane air-cooling system in accordance with a second alternate embodiment of the present invention.

FIGS. 3 and 4 illustrate separate embodiments of the present invention that function similarly to the previously described vane air-cooling system 18 of FIGS. 1-2B, but include, among other things, variations in the configuration and orientation of the individual vanes. Like reference numbers are used in FIGS. 3 and 4 to refer to like components from FIGS. 2A and 2B. Correspondingly, the components of FIGS. 3 and 4 should be considered to be identical to a respective component of FIGS. 2A-2B identified with a common reference number unless specified otherwise.

Turning then to FIG. 3, an enlarged perspective view of a vane air-cooling system in accordance with an alternate embodiment of the present invention is shown generally as 118. The vane air-cooling system 118 includes a front cover 12 and a plurality of vanes or annular fins 116, configured to increase the convective dissipation of heat from the torque converter assembly 10 and ECCC 14 to the surrounding ambient air. The vanes 116 of the vane air-cooling system 118 are preferably arranged in a circumferentially spaced circular array along the outer periphery of a circular base 13 and contoured portion 27 of the front cover 12. According to the embodiment of FIG. 3, the vanes 116 are elongated in a direction extending at desired angles, identified generally as 173 in FIG. 3, relative to a true radius R along the circular base 13.

Similar to the embodiment of FIGS. 2A and 2B, the vanes 116 of FIG. 3 each have substantially opposing first and second surfaces 174 and 175, respectively, first and second substantially opposing edges 178 and 179, respectively, a crown portion 181, and a bottom portion 183 fixedly connecting the vane 116 to the circular base 13 and contoured portion 27 of the front cover 12. The dimensions of the vanes 116 (e.g., height, thickness, and length) are predetermined and may vary indefinitely. Although depicted as having identical configurations, each vane 116 may vary from the next. According to FIG. 3, the vanes 116 preferably have a curved fin configuration. More specifically, the crown portion 181 and bottom portion 183 have a substantially identical convex plan-profile, and the first edge 78 being radially out of plane from the second edge 79, relative to the true radius R. In addition, the first surface 174 has a concave profile and the second surface 175 has a convex profile, thereby creating a curved configuration.

The circular base 13, rounded portion 17, centering pilot 19, contoured portion 27 of the front cover 12, and the first and second surfaces 174, 175, first and second edges 178, 179, and crown surface 181 of the vanes 116, and the inner surface 43 of the flex plate 40 define a cooling gallery therebetween. Provided the vanes 116 are turning at engine speed (e.g., through the driving engagement between the annular housing member 26 and the flex plate 40 of FIG. 1), air circulation in the gap between the torque converter assembly 10 and flex plate 40 (e.g., space 77 of FIG. 1) is enhanced.

Referring to FIG. 4, an enlarged perspective view of a vane air-cooling system in accordance with another alternate embodiment of the present invention is shown generally as 218. The vane air-cooling system 218 includes a front cover 212 and a plurality of vanes or annular fins 216, configured to increase the convective dissipation of heat from the torque converter assembly 10 and ECCC 14 to the surrounding ambient air. The vanes 216 of the vane air-cooling system 218 are preferably arranged in a circumferentially spaced circular array along the outer periphery of a circular base 13 and contoured portion 27 of the front cover 12. According to the embodiment of FIG. 4, the vanes 216 are each positioned radially coextensive (in-plane) with a true radius R along the circular base 13.

The vanes 216 of FIG. 4 have substantially opposing first and second surfaces 274 and 275 respectively, first and second substantially opposing edges 278 and 279, respectively, a crown portion 281, and a bottom portion 283 fixedly connected to the circular base 13 and contoured portion 27. The dimensions of the vanes 216, including height, thickness, and length, are predetermined and may vary indefinitely (and are therefore not shown herein.) Although depicted as having identical configurations, each vane 216 may vary from the next. According to the embodiment of FIG. 4, the vanes 216 preferably have a straight-fin configuration. More specifically, first and second surfaces 274, 275 create a substantially uniform thickness across the entire length of each vane 216, the first edge 278 being radially in-plane with die second edge 279. Accordingly, the crown portion 281 has a substantially linear plan profile, creating a flat-blade configuration.

The circular base 13, rounded portion 17, centering pilot 19, contoured portion 27 of the front cover 12, and the first and second surfaces 274, 275, first and second edges 278, 279, and crown surface 281 of the vanes 216, and the inner surface 43 of the flex plate 40 define a cooling gallery therebetween. Provided the vanes 216 are turning at engine speed (e.g., through the driving engagement between the annular housing member 26 and the flex plate 40 of FIG. 1), air circulation in the gap between the torque converter assembly 10 and flex plate 40 (e.g., space 77 of FIG. 1) is enhanced.

While the best modes for carrying out the present invention have been described in detail herein, those familiar with the art to which this invention pertains will recognize various alternative designs, modifications, and embodiments for practicing the invention within the scope of the appended claims.

The invention claimed is:

1. A cooling system for a torque converter assembly having a housing shell and a flex plate, comprising:
   a housing cover having opposing exterior and interior surfaces defining:
      a rotatable base portion operatively configured to attach to the flex plate; and
      a wall portion extending from an outer periphery of said base portion and operatively configured to attach to the housing shell; and
   a plurality of vanes positioned along said outer periphery of said base portion and configured to increase convective dissipation of heat from the torque converter assembly to surrounding ambient air when said base portion rotates;
   wherein each of said vanes has a crown portion connected to a bottom portion by opposing first and second edges and opposing first and second surfaces, wherein said bottom portion is operatively connected to said base portion.

2. The cooling system of claim 1, wherein said first and second edges are oriented radially in-plane relative to a true radius extending from a center of said housing cover.

3. The cooling system of claim 2, wherein said first and second surfaces extend substantially perpendicular from said base portion.

4. The cooling system of claim 1, wherein said first and second edges are oriented radially out-of-plane relative to a true radius extending from a center of said housing cover.

5. The cooling system of claim 4, wherein said first surface has a concave profile and said second surface has a convex profile relative to said true radius.

6. The cooling system of claim 5, wherein said first and second edges have a convex profile relative to said base portion.

7. The cooling system of claim 6, wherein said base portion is substantially circular, said vane members being positioned equidistant about said base portion periphery between the flex plate and the housing shell.

8. The cooling system of claim 7, wherein said wall portion extends substantially perpendicular from said base portion in a continuous manner about said outer periphery.

9. The cooling system of claim 8, wherein said base portion is configured to attach to the flex plate by at least one stud member.

10. A cooling system for a torque converter assembly having an impeller and a flex plate, the vane air-cooling system comprising:
- a housing shell operatively connected to the impeller to at least partially define a fluid chamber therebetween;
- a housing cover including:
  - a rotatable base portion operatively configured to attach to the flex plate;
  - a wall portion extending from an outer periphery of said base portion and operatively configured to attach to said housing shell; and
  - a plurality of vanes positioned along said outer periphery of said base portion between said housing shell and the flex plate and configured to increase convective dissipation of heat from the torque converter assembly to surrounding ambient air when said base portion rotates.

11. The cooling system of claim 10, wherein said vanes have a crown portion connected to a bottom portion by opposing first and second edges and opposing first and second surfaces, wherein said bottom portion is operatively connected to said base portion.

12. The cooling system of claim 11, wherein said first and second edges are oriented radially in-plane relative to a true radius extending from a center of said housing cover.

13. The cooling system of claim 12, wherein said first and second surfaces extend substantially perpendicular from said base portion.

14. The cooling system of claim 11, wherein said first and second edges are oriented radially out-of-plane relative to a true radius extending from a center of said housing cover.

15. The cooling system of claim 14, wherein said first and second surfaces have a convex profile relative to said true radius.

16. The cooling system of claim 15, wherein said first and second edges have a convex profile relative to said base portion.

17. The cooling system of claim 16, wherein said housing cover further includes a centering pilot extending substantially perpendicular from said base portion and configured to coaxially align the torque converter assembly with the flex plate.

18. The cooling system of claim 17, wherein said base portion is substantially circular, said wall portion extending substantially perpendicular from said base portion in a continuous manner about said outer periphery.

19. The cooling system of claim 18, wherein said base portion is configured to attach to the flex plate by at least one stud member.

20. A torque converter assembly for an automatic transmission having a plate member drivingly connected to an engine output shaft, the torque converter assembly comprising:
- an impeller member operatively connected to an impeller hub;
- an annular housing shell operatively connected to said impeller member;
- a housing cover operatively connected to said housing shell to at least partially define a fluid chamber therebetween, said housing cover including:
  - a base portion operatively connected to the plate member to be rotated thereby; and
  - a wall portion extending substantially perpendicular from an outer periphery of said base portion in a substantially continuous manner;
- a turbine member disposed within said fluid chamber and operatively connected to a turbine shaft;
- a stator member disposed between said impeller member and said turbine member within said fluid chamber and operatively connected to a stator shaft;
- a torque converter clutch disposed within said fluid chamber; and
- a plurality of vane members positioned along said outer periphery of said base portion between said housing shell and plate member and configured to increase convective dissipation of heat from the torque converter assembly to surrounding ambient air when said base portion rotates;
- wherein each of said plurality of vane members has a crown portion connected to a bottom portion by opposing first and second edges and opposing first and second surfaces, wherein said bottom portion is operatively connected to said base portion; and
- wherein said first surface of at least sonic of said plurality of vane members has a concave profile and said second surface has a convex profile relative to a true radius extending from a center of said housing cover.

* * * * *